United States Patent [19]

Inoue et al.

[11] Patent Number: 5,326,315

[45] Date of Patent: Jul. 5, 1994

[54] AIR PASSAGE CHANGEOVER DEVICE

[75] Inventors: Michi Inoue, Kasugai; Akihito Higashihara, Chiryu; Hiroyuki Yamazaki, Haza; Fumio Kato, Kariya; Hirotaka Chishiki, Obu, all of Japan

[73] Assignee: Nippondenso Co., Ltd., Kariya, Japan

[21] Appl. No.: 982,684

[22] Filed: Nov. 27, 1992

[30] Foreign Application Priority Data

Nov. 29, 1991 [JP] Japan .................. 3-316922
Mar. 4, 1992 [JP] Japan .................. 4-47263

[51] Int. Cl.$^5$ ............................ B60H 1/00; B60S 1/54
[52] U.S. Cl. ............................ 454/126; 454/156
[58] Field of Search .............. 165/42, 43; 454/121, 454/126, 156, 159, 160

[56] References Cited

U.S. PATENT DOCUMENTS 5,105,730 4/1992 Smith .................. 454/145 X
5,162,020 11/1992 Asano et al. .............. 454/156

FOREIGN PATENT DOCUMENTS 459473 12/1991 European Pat. Off. .
500422 8/1992 European Pat. Off. .
63-180512 7/1988 Japan .
1-085809 3/1989 Japan .
1-141116 6/1989 Japan .

*Primary Examiner*—Harold Joyce
*Attorney, Agent, or Firm*—Cushman, Darby & Cushman

[57] ABSTRACT

A damper device for use in an air conditioner of a vehicle, which changes over the direction and volume of an air flow in an air conditioner when a screen (41) is slid. The screen has a laminated resin coat layer (8) or the resin film layer (5), and the cloth layer (7). The resin film layer (5) has excellent tensile and bending strength, and exhibits anti-creep properties, and further it inhibits elastic deformation or plastic deformation (initial elongation) that is the weak point of the cloth layer (7). The cloth layer (7) makes up for the tear strength that is a weak point of the resin film layer (5). The resin coat layer (8) makes up for anti-abrasion and low frictional properties that are weak points of the cloth layer (7). Each layer is provided with flexibility, moisture resistance and heat resistance, so that the entire arrangement of layers provides the necessary characteristics required for the screen.

8 Claims, 6 Drawing Sheets

AIR PASSAGE CHANGEOVER DEVICE

BACKGROUND OF THE INVENTION

1. Field of the Invention

The present invention relates to an air passage changeover device.

2. Description of the Related Art

Conventionally, a plate damper device that controls an air volume or changes an air flow by the rotation of a damper plate, has been put into practical use for an air passage changeover device. Japanese Unexamined Patent Publication (Kokai) No. 141116-1989 discloses a film damper that is operated in the following manner: a flexible screen, for example, made of a polyethylene film, is slid along each outlet in an air conditioner case; and the air volume blown out from the outlet is individually controlled by the amount of overlap of the outlet and a draft hole formed in a predetermined position on the polyethylene film.

However, according to the results of various investigations, the following has been found: the screen of a resin film adopted to the aforementioned conventional film damper device satisfies the requirements of tensile strength, air flow sealing property and flexibility, however, it is not practically sufficient from the viewpoint of tear strength.

That is, in order to prevent air leakage, the screen used for the air passage changeover device must be slid along the inner wall surface of the case over all the circumference of each outlet. Also, the screen is curved along drive and guide rollers, the diameter of which is relatively small. Therefore, stress is locally concentrated on the screen, so that a screen made of a resin film is torn. Accordingly, the screen cannot be put into practical use because its tear strength is insufficient.

In order to solve the problems, the inventors investigated various materials for the screen.

First, the inventors investigated rubber and fiber reinforced rubber because these can stand bending stress applied by the drive and guide rollers and, further, they are flexible. However, they are susceptible to deformation. Also, when the position and profile of the draft hole are varied, it is difficult to accurately carry out damper functions such as control of an air volume and changeover of an air flow direction. Moreover, their moisture and heat resistant properties are not good.

Although a metallic sheet has a large number of advantages, its flexibility is not good. In particular, it is difficult to curve the metallic sheet along a guide roller of a small diameter and to wind it around a drive roller of a small diameter, and the metallic sheet is susceptible to plastic deformation.

Flexibility and tear strength of fabrics are sufficiently high. However, in the case of fabrics of usual thickness, the air flow sealing property is not sufficient, and the surface of fabrics becomes rough when they are slid. Further, noises are caused by the uneven surface of fabrics, and the screen of fabrics cannot be smoothly driven since the frictional coefficient is higher than that of a resin film. Furthermore, a permanent elongation referred to as an initial elongation of fabrics is about 2. Therefore, the position of a draft hole is changed by the elongation. Accordingly, it is difficult to carry out accurate air flow control.

SUMMARY OF THE INVENTION

The present invention has been achieved to solve the aforementioned problems. It is a primary object of the present invention to provide an air passage changeover device including a screen of excellent performance. That is, in order to accomplish the aforementioned object, the present invention adopts the following essential technical structure.

The present invention is aimed at providing an air passage changeover device comprising: an air passage to guide an air flow; an air blowing means to blow air into the air passage; a drive roller provided in the air passage; and a screen made of a flexible thin film having a draft hole through which air passes, wherein the air passage is changed over when the screen driven by the drive roller is moved to slide on the members provided around the screen, the screen being made of at least two different members joined with each other, having at least one of the required properties of high tensile strength, high tear strength, flexibility, low friction property and air sealing property, and the outermost surface of the screen having a low frictional property.

More specifically, the present invention is aimed at providing an air passage changeover device comprising: an air passage to guide an air flow; an air blowing means to blow air into the air passage; a drive roller provided in the air passage; and a screen made of a flexible thin film having a draft hole through which air passes, wherein said air passage is changed over when the screen driven by the drive roller is moved to slide on the members provided around the screen, and wherein the screen includes a flexible high strength member having high tensile and tear strength and also includes a flexible low frictional member having low friction and high air sealing properties.

Another example of the screen of the air passage changeover device of the invention comprises the same structure, wherein the screen is made of a low frictional flexible material of high tensile strength having a high air sealing property, and is also made of a flexible material of high tear strength.

That is, the present invention is directed to solving the problems of a conventional film damper mainly composed of a film that is used for a screen having a predetermined draft hole for adjusting an air flow in an air passage. The screen of the present invention is a layer composed of at least two kinds of members having different characteristics, for example, a film layer provided on at least one side of a cloth layer, or a resin material coated on one side of the cloth layer. That is, two different kinds of layers are provided such as a film layer and a fabric layer, or a resin coated layer and a fabric layer. When the two kinds of layers are provided with different characteristics, the conventional problems are completely solved.

For example, a material of high strength is used for the first layer so that the strength of the first layer can be increased, and a material of low friction is used for the second layer so that the friction of the second layer can be lowered.

Since the screen of the present invention is structured in the manner described above, the screen can satisfy at least one of the required characteristics of high tensile strength, high tear strength, flexibility, low frictional property, and air sealing property. Therefore, even when the screen is conveyed and curved along drive and guide rollers provided in the damper section, and even when stress is concentrated on a specific portion on the screen, there is no possibility of the screen being torn. Further, the strength of the screen is high, so that it becomes possible to apply a relatively high tension onto the screen and to intimately contact it with the inner surface of the damper so as to slide thereon. Therefore, the screen is provided with a sufficient air sealing property, and its durability is high even when it is used over a long period of time.

DETAILED EXPLANATION OF THE PREFERRED EMBODIMENT

With reference to the attached drawings, an embodiment of the air passage changeover device of the present invention will be explained in detail as follows.

Figure 1:
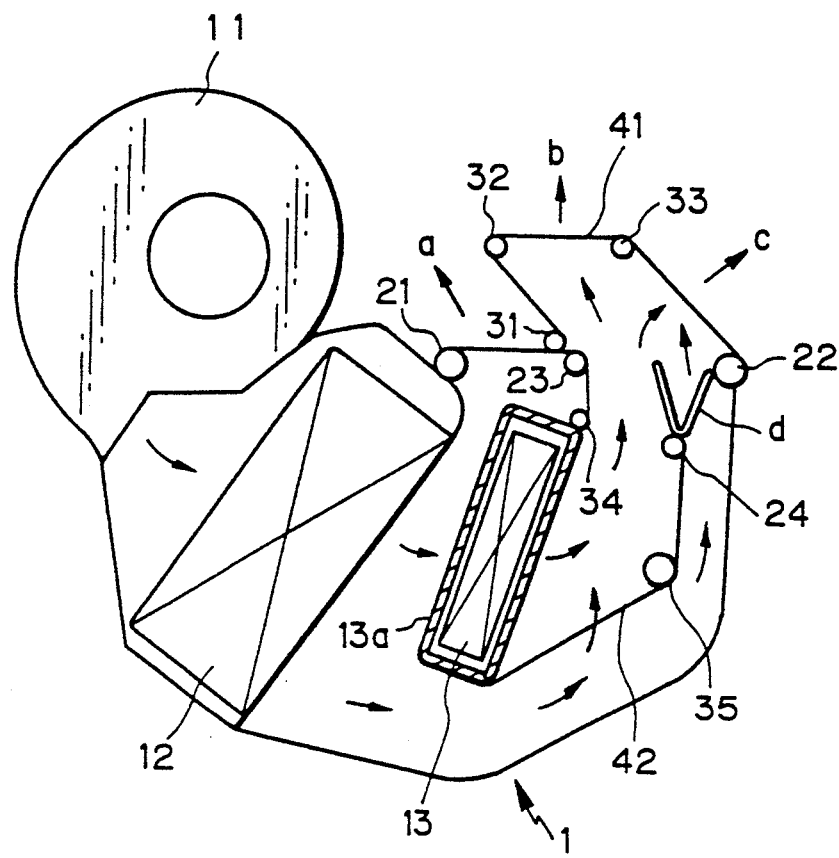
FIG. 1 is a sectional schematic illustration of an air conditioner for vehicle use to which the air passage changeover device of the present invention is applied.

First, FIG. 1 shows an example of the air conditioner for a vehicle to which the air passage changeover device of the present invention is applied.

This air conditioner includes a fan 11, and an air conditioner case 1 in which an evaporator 12 for air cooling and a heater 13 for air heating are provided. The air conditioner case 1 includes: drive rollers 21 to 24 for winding a screen; a guide plate d; guide rollers 31 to 35 for guiding the screen; a first screen 41, both ends of which are secured to the drive rollers 21 and 22, whereby the first screen 41 is used to change an air blowing direction; and a second screen (air mixing damper) 42, both ends of which are secured to the drive rollers 23 and 24, whereby the second screen 42 is used to adjust the amount of air passing through the heater 13.

Motors are provided in the drive rollers 21 to and both ends of the drive rollers are supported by the inner wall of the case 1, and when the motors are energized, the drive rollers are rotated to wind up the screens 41 and 42. The outside diameters of the drive rollers 21 to 24 are not more than 20 mm.

The guide rollers 31 to 35 are provided to change the travelling directions of the screens 41 and The screen 41 is a film damper for changing over the direction of the air flow among a foot outlet a, defroster outlet b and face outlet c that are not shown in the drawing. A draft hole (not shown), the profile of which is a long hole, is formed in an appropriate position on the screen 41, so that the direction of the air flow can be changed when the screen 41 is slid and the draft hole is displaced. That is, a foot opening a, defroster opening b and face opening c (these openings are not shown), that are communicated with the foot outlet a, defroster outlet b and face outlet c, are provided in the air conditioner case 1, and the amount of the air flow to each opening is controlled by the draft hole provided on the screen 41.

Figure 10:
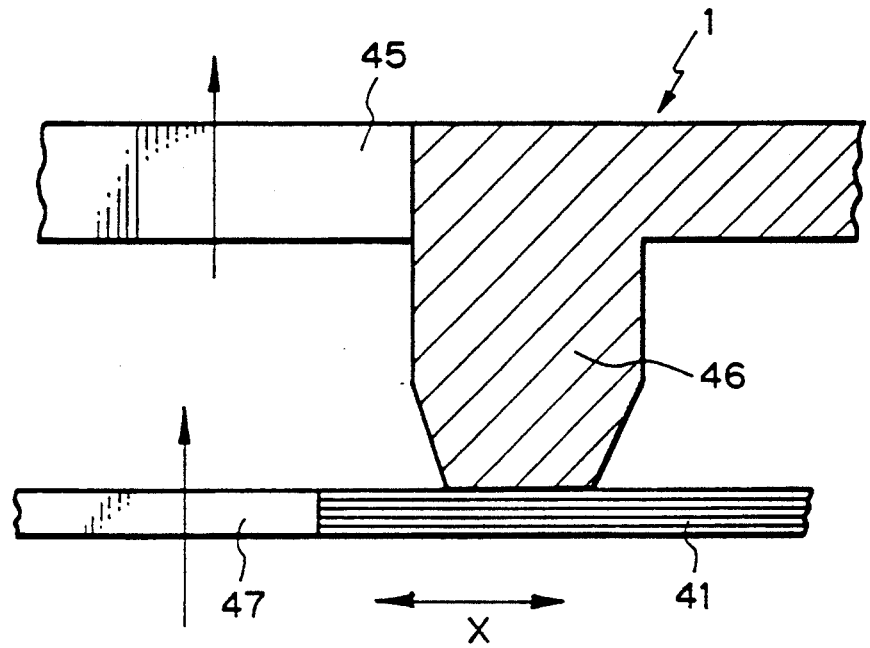
FIG. 10 is a partial sectional view of the screen of Embodiment 1 in which the device shown in FIG. 1 is used.

FIG. 10 is an enlarged sectional view showing the foot outlet 45 and its peripheral portion. A sliding edge 46 is protruded inside from the air-conditioner case 1 and encircles the foot outlet 45. The screen 41 slides in a sliding direction X on the top of this sliding edge 46. When the draft hole 47 of the screen 41 is communicated with the foot opening 45, conditioned air is blown out into the foot outlet not shown.

The structure of the screen 42 is the same as that of the screen 41. The screen 42 is provided in such a manner that it covers a grid-shaped frame 13a encircling the heater 13. When the screen 42 is slid, the ratio of the amount of air passing through the heater 13 to that not passing through the heater 13 is controlled. The screen 42 also slides on the grid-shaped frame 13a.

The structure of the screen used for the aforementioned air passage changeover device will be explained in detail as follows.

Figure 13:
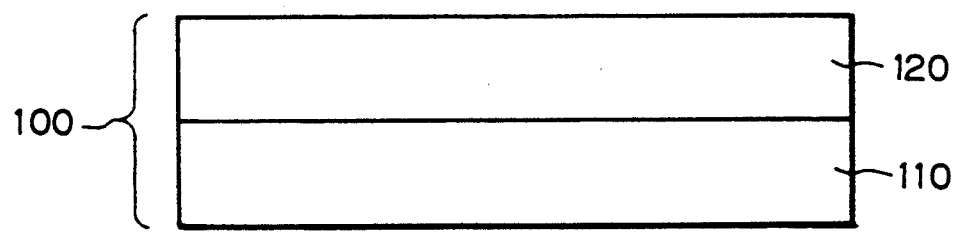
FIG. 13 is a sectional view showing the essential structure of the screen of the present invention.

As shown in FIG. 13, the screen 100 used in the air passage changeover device of the present invention includes layers composed of at least two kinds of members of different characteristics, that is, the first layer 110 and the second layer 120. When at least two kinds of different members are joined in the manner described above, the screen can satisfy at least one of the required characteristics of high tensile strength, high tear strength, flexibility, low frictional property, and air sealing property. Preferably, the outermost surface, for example, the surface coming into contact with the drive or guide rollers provided in the air passage of the air passage changeover device, is provided with a low frictional property.

More specifically, the screen includes the first layer 110 made of flexible high strength material having high tensile and tear strength, and the second layer 120 made of flexible low frictional material having an air sealing property.

Another example of the screen 100 of the present invention includes the first layer 110 made of flexible high strength material having high tensile strength, low frictional property and air sealing property, and the second layer 120 made of flexible high tear strength material.

For example, the following materials are used for the high strength member of the screen of the present invention: the cloth composed of a large number of fibers, includes a woven fabric, a knitting fabric and a nonwoven fabric. Also, for example, the following materials are used for the low frictional member of the screen of the present invention: a film-like member composed of high polymer material, and a resin coated layer impregnated into at least one surface of the cloth layer composed in the manner described above.

The low frictional layer itself may be made of resin of high polymer material having a low frictional property. Alternatively, only the surface of the layer, which comes into contact with the drive and guide rollers, may be coated with low frictional resin.

For example, the high tensile strength member of the screen of the present invention may be composed of a resin film layer. The tear strength member of the screen of the present invention may be composed of the aforementioned cloth layer, and further the tear strength member may be composed of a cloth layer, at least one surface of which is coated with the resin film.

The screen in the preferred embodiment of the present invention includes the resin film layer, the cloth layer adhered onto one surface of the resin film layer, and the resin coated layer impregnated onto the surface of the cloth layer.

Also, the screen in the preferred embodiment of the present invention includes the resin film layer, the cloth layers adhered onto both surfaces of the resin film layer, and the resin coated layers impregnated onto the surfaces of both cloth layers.

Also, the screen in the preferred embodiment of the present invention includes the cloth layer and the resin film layers coated on both surfaces of the cloth layer.

In the preferred embodiment of the present invention, it is preferable that the cloth layer is composed of knitting including a plurality of warps disposed in the sliding direction, and a plurality of wefts disposed perpendicular to the warps, wherein the warps and wefts are crossed with each other.

In the case where fabrics are used for the cloth layer in the aforementioned preferred embodiment of the present invention, it is preferable that the plurality of warps disposed in the sliding direction and the plurality of wefts disposed diagonally with regard to the warps are crossed with each other.

In the preferred embodiment of the present invention, the surface of the screen is preferably provided with a disinfectant.

Examples of usable resins for the resin film layer of the present invention are as follows: PPS (polyphenylene sulfide), PET (polyethylene terephthalate), PEN (polyethylene naphthalate), PEI (polyether imido), PI (polyimido), PES (polyether sulfone), PEEK (polyether etherketon), PSF (polysulfone), PC (polycarbonate), PVC (polyvinyl chloride), and PS (polysulfone). The resin film layer can be extended in the winding direction. The thickness of the resin film layer is preferably 20 to 150 $\mu$m, and more preferably 38 to 75 $\mu$m. In the case where the resin film layer is thinner than 20 $\mu$m, disadvantages such as lack of tensile strength and increase in creep are caused. On the other hand, in the case where the resin film layer is thicker than 150 $\mu$m, disadvantages such as a deterioration of flexibility and an increase in required handling force are caused.

The cloth layer can be composed in the following manner: the filaments of nylon fibers, PET fibers, PPS fibers, m-aramid fibers, p-aramid fibers, novoloid fibers, PTFE fibers, glass fibers, carbon fibers, and boron fibers are woven; or they are formed into nonwoven fabrics by a well known method. The thickness of the cloth layer is preferably 50 to 200 $\mu$m, and more preferably 50 to 80 $\mu$m. In the case where the cloth layer is thinner than 50 $\mu$m, a disadvantage is caused in which the tear strength is lowered. On the other hand, in the case where the cloth layer is thicker than 120 $\mu$m, it becomes difficult to curve the cloth layer, so that the required handling force is increased. The cloth layer can be formed in such a manner that single long fibers (monofilaments) are directly woven. Alternatively, the cloth layer may be formed in such a manner that the twisting of long or short fibers is woven. The denier of twisting may be 20 to 70.

In order to improve the anticurling property, it is effective that the thickness and material of the cloth layer provided on one side are the same as those of the cloth layer provided on the other side. However, thickness fluctuation of about 20% can be allowed for practical use. The weaving method, knitting method, nonwoven fabric manufacturing method, material and thickness of the cloth layer on one side may be different from those of the cloth layer on the other side. However, it is important to prevent the entire screen from curling.

When the resin film layer and the cloth layer are adhered to each other, an adhesive of epoxy, urethane and epoxy of denatured NBR and denatured silicon may be adopted. The thickness of the adhesive is preferably 1 to 20 $\mu$m, or 5 to 30 g/m$^2$. The resin film layer and the cloth layer can be directly adhered by means of high frequency welding without using an adhesive.

Silicon resin, acrylic resin, fluorocarbon resin and their mixture, the frictional coefficients of which are low, can be adopted to the resin coat layer. The thickness of the resin coat layer is 1 to 20 $\mu$m, or 5 to 30 g/m$^2$.

According to this device, when the drive roller is rotated, the screen is slid in the air passage, and the travelling direction of the screen is changed by the guide rollers, and the position of the draft hole is shifted so that the air passage can be changed over. In this case, the changeover of the air passage includes the change of an air flow direction and that of an air flow volume.

The screen of the present invention is composed in such a manner that the resin coat layer is impregnated into the cloth layer. According to the results of an experiment, the cloth layer is provided with excellent tear strength and bending properties (that is, excellent flexibility). Further, the cloth layer is provided with tensile strength that can be put into practical use. The resin coat layer improves the inferior unpractical air sealing property (air penetration preventing property) and surface friction property of the cloth layer, and further prevents the nap from being raised on the surface of the cloth layer when the screen is slid.

According to the present invention, the cloth layer is coated with the resin film layer.

According to an experiment, the cloth layer is provided with excellent tear strength and bending characteristics (that is, flexibility), and further the cloth layer makes up for the inferior unpractical tear strength of the resin film layer. The resin film layer makes up for the inferior unpractical air sealing property (air penetration preventing property) and surface friction property of the cloth layer, and further prevents the nap from being raised on the surface of the cloth layer when the screen is slid. Further, the resin film layer makes up the tensile strength of the cloth layer that is slightly insufficient.

As explained above, since the screen of the device of the present invention is composed of the cloth layer into which the resin coat layer is impregnated, the cloth layer and the resin coat layer can realize a practical screen in cooperation with each other which provides practical mechanical properties (flexibility, tensile strength, tear strength and low frictional coefficient), nap rising prevention property, and air sealing property (air penetration preventing property).

In another device of the present invention, the screen is composed of the cloth layer coated with the resin film layer. Therefore, the cloth layer and the resin film layer can realize a practical screen in cooperation with each other which provides practical mechanical properties (flexibility, tensile strength, tear strength and low frictional coefficient), nap rising prevention property, and air sealing property (air penetration preventing property), and in which the tensile strength and an anti-elongation property of the cloth layer can be further improved.

An example of the screen used for the present invention will be explained as follows.

Embodiment 1

Figure 2:
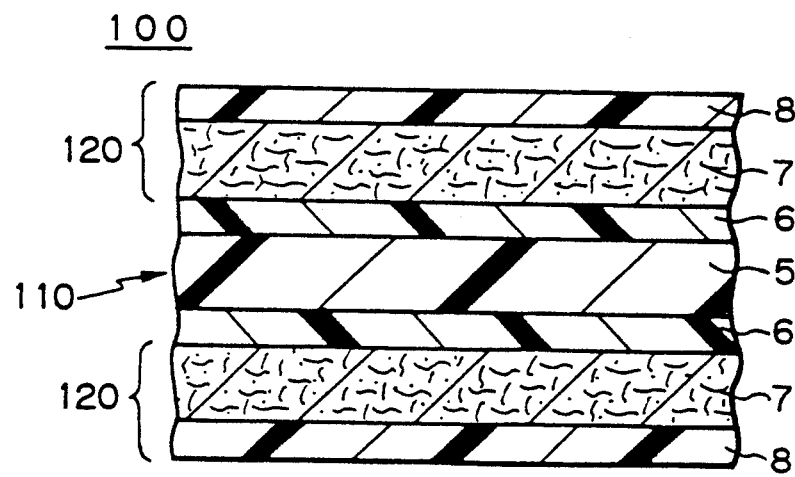
FIG. 2 is a partial sectional view of the screen of Embodiment 1 in which the device shown in FIG. 1 is used.

The screen of Embodiment 1 is shown in FIG. 2.

This screen 100 includes the resin film layer 5 corresponding to the first layer 110, the cloth layers 7 of the same thickness corresponding to the second layers 120 that are individually adhered onto both surfaces of the resin film layer 5, and the resin coat layers 8 provided on the surfaces of the cloth layers 7.

The resin film layer 5 was composed of a PPS resin layer of 50 $\mu$m thick extended in the winding direction. The adhesive layer 6 was composed of an epoxy (denatured NBR) adhesive layer of 5 $\mu$m thick. The cloth layer 7 was composed of a 6, 6 nylon layer of various thickness. The resin coat layer 8 was composed of a silicon compound coated with a solvent at the ratio of 12 g/m$^2$ (in a dry condition).

In Embodiment 1, three kinds of samples ( the first, second and third examples) were made and tested. The composition of each sample is shown in Table 1. In each sample, fabrics were used for the cloth layer.

In the first example, the cloth layer 7 was directly woven from monofilaments of 20 deniers so that the cloth layer 7 of 50 $\mu$m thick was made.

In the second example, the cloth layer 7 was made in such a manner that the twisting of 30 deniers was woven into the cloth layer of 80 $\mu$m thick.

In the third example, the cloth layer 7 was made in such a manner that the twisting of 70 deniers was woven into the cloth layer of 120 $\mu$m thick.

Embodiment 2

Figure 3:
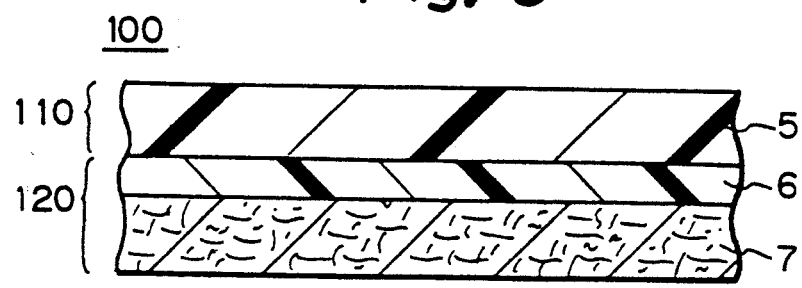
FIG. 3 is a partial sectional view of the screen of Embodiment 2 in which the device shown in FIG. 1 is used.

The screen of Embodiment 2 is shown in FIG. 3.

As shown in Table 1, two kinds of samples(the first and second examples) were made for Embodiment 2. Fabrics were used for the cloth layers.

This screen 100 includes the resin film layer 5 corresponding to the first layer 110, and the cloth layer 7 corresponding to the second layer 120 that was adhered onto one surface of the resin film layer 5 with the adhesive layer 6.

The materials of the resin film layer 5 and cloth layer 7 were the same as those of the first, second and third examples of Embodiment 1. The cloth layer 7 of the first example in Embodiment 2 was the same as that of the second example in Embodiment 1, and the cloth layer 7 of the second example in Embodiment 2 was the same as that of the third example in Embodiment 1.

Embodiment 3

Figure 4:
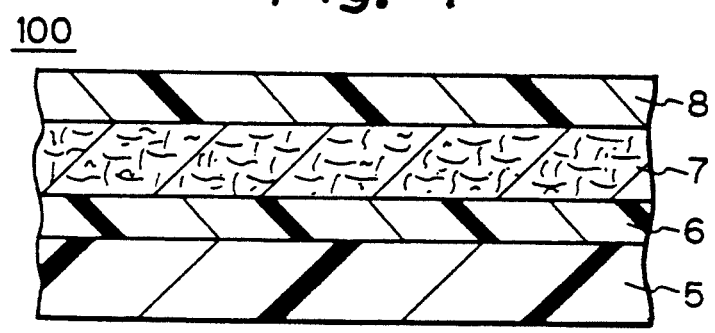
FIG. 4 is a partial sectional view of the screen of Embodiment 3 in which the device shown in FIG. 1 is used.

The screen of Embodiment 3 is shown in FIG. 4.

This screen 100 includes the resin film layer 5, the cloth layer 7 adhered onto one surface of the resin film layer 5 with the adhesive layer 6, and the resin coat layer 8 impregnated onto the surface of the cloth layer 7.

Except for the silicon coat later 8, the composition and thickness were the same as those of Embodiment 3.

Embodiment 4

Figure 5:
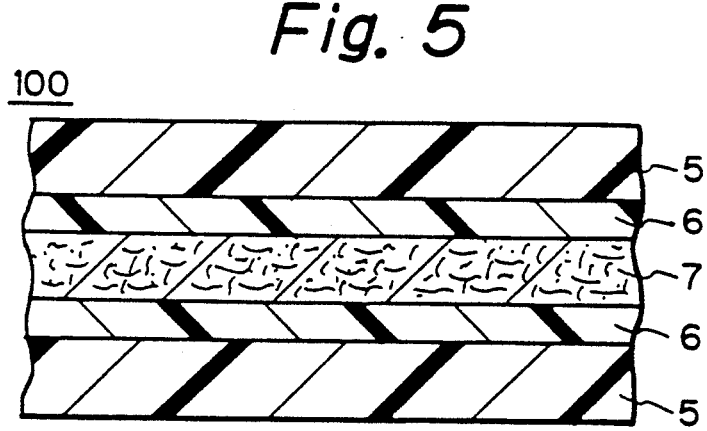
FIG. 5 is a partial sectional view of the screen of Embodiment 4 in which the device shown in FIG. 1 is used.

The screen of Embodiment 4 is shown in FIG. 5.

This screen 100 includes the cloth layer 7, and the resin film layers 5 adhered onto both surfaces of the cloth layer 7 with the adhesive layers 6.

The materials of the resin film layer 5 and cloth layer 7 were the same as those of the first, second and third examples in Embodiment 1. The thickness of the resin film layer 5 was 25 $\mu$m. The cloth layer 7 was the same as that of the third example in Embodiment 1.

The composition and thickness of the adhesive and resin coat layers were the same in each embodiment.

Embodiment 5

Figure 6:
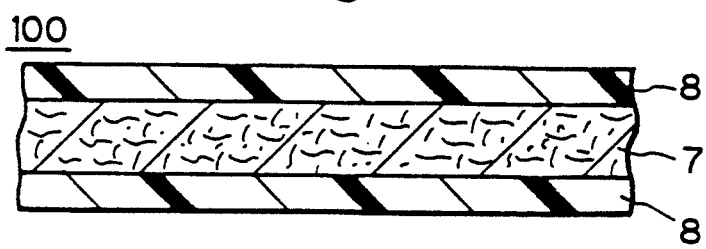
FIG. 6 is a partial sectional view of the screen of Embodiment 5 in which the device shown in FIG. 1 is used.

The screen of Embodiment 5 is shown in FIG. 6.

This screen 100 includes the cloth layer 7, and the resin coat layers 8 impregnated onto both surfaces of the cloth layer 7.

Aromatic amide fibers (the brand name: Kepler) of 200 to 15000 deniers (about 1000 deniers in this embodiment) were used for the material of cloth layer 7. The thickness of the cloth layer 7 was 220 $\mu$m. Silicon.acrylic.fluorine emulsion (the brand name: Sharinu E manufactured by Shinetsu Kagaku Co.) was impregnated onto the cloth layer 7 so as to form the resin coat layer 8.

Using the test pieces of the aforementioned screens, the tensile strength, tear strength, coefficient of dynamic friction, shear stress on the contact surface with the roller, and curling amount were investigated. The results are shown in Table 1.

TABLE 1

|  | First example of Embodiment 2 Film: PPS 50 $\mu$m Cloth: NY 80 $\mu$m | Second example of Embodiment 2, and Embodiment 3 Film: PPS 50 $\mu$m Cloth: NY 120 $\mu$m | First example of Embodiment 1 Film: PPS 50 $\mu$m Cloth: NY 50 $\mu$m | Second example of Embodiment 1 Film: PPS 50 $\mu$m Cloth: NY 80 $\mu$m |
| --- | --- | --- | --- | --- |
| thickness ($\mu$m) | 120 | 150 | 220 | 200 |
| Tensile strength (kgf/mm) | 6.3 | 5.2 | 3.6 | 4.5 |
| (5% Elongation) (kgf/mm) | 0.75 | 0.78 | 0.80 | 0.90 |
| Tear strength (kgf/mm) | 0.15 | 0.36 | 0.68 | 0.57 |

TABLE 1-continued

| Coefficient of dynamic friction ($\mu$) | | | | |
|---|---|---|---|---|
| Not coated with silicon | | 0.27 | 0.28 | 0.28 |
| Coated with silicon | | 0.13 | 0.15 | 0.15 |
| Shear strength on the inner side surface of the screen $\tau$ compression (kgf/mm$^2$) | $\tau = 0.42$ (Wrinkles were caused on the inside of PPS) | $\tau = 0.42$ (Wrinkles were caused on the inside of PPS.) | $\tau = 0.955$ | $\tau = 1.29$ |
| Amount of curl | | 20% | | |

| | Third example of Embodiment 1 Film: PPS 50 $\mu$m Cloth: NY 120 $\mu$m | Embodiment 4 Film: PPS 25 $\mu$m Cloth: NY 120 $\mu$m | Embodiment 5 Cloth: 220 $\mu$m (impregnated into silicon acrylic fluorine emulsion) |
|---|---|---|---|
| thickness ($\mu$m) | 250 | 150 | 220 |
| Tensile strength (kgf/mm) | 4.2 | 6.0 | 4.78 |
| (5% Elongation) (kgf/mm) | 1.04 | 0.90 | 0.78 |
| Tear strength (kgf/mm) | 1.20 | 0.3 | 0.44 |
| Coefficient of dynamic friction ($\mu$) | | | |
| Not coated with silicon | 0.29 | | |
| Coated with silicon | 0.18 | | 0.13 |
| Shear strength on the inner sidesurface of the screen $\tau$ compression (kgf/mm$^2$) | $\tau = 1.31$ | $\tau = 1.28$ (Buckling was caused on the inside of PPS.) | |
| Amount of curl | 0% | 0% | |

Figure 8:
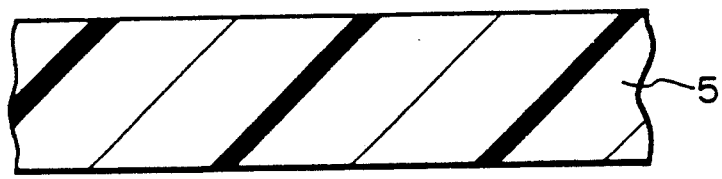
FIG. 8 is a partial sectional view of a screen used as a comparative example.

A partial sectional view of the screen tested as a comparative example is shown in FIG. 8. This screen is composed of only the resin film layer 5.

Resins of PPS, PET, PEN, PEI, PI and PES were adopted to the material, and the thickness of each resin film layer was 50 $\mu$m. The experimental results are shown in Table 2.

TABLE 2

| | PPS Polyphenylene sulfide | PET Polyethylene terephthalate | PEN Polyethylene naphthalate | PEI Polyether imido | PI Polyimido | PES Polyether sulfone |
|---|---|---|---|---|---|---|
| Thickness ($\mu$m) | 50 | 50 | 50 | 50 | 50 | 50 |
| Tensile strength (kgf/mm$^2$) | 10.4 | 8.0 | 14.0 | 10.8 | 2.1 | 7.06 |
| (5% Elongation) (kgf/mm$^2$) | 0.52 | 0.40 | 0.70 | 0.54 | 0.11 | 0.38 |
| Tear strength (kgf/mm) | 0.03 | 0.10 | 0.03 | 0.02 | 0.01 | 0.10 |

The conditions are described as follows.

The tensile strength test method for plastic films and sheets according to JIS K7127 (1989) was applied to the tensile strength test, and the profile of the test piece was No. 5 dumbbell-shape of JIS K7127, and the testing speed was 50 mm/min.

The tear test method for ethylene.vinyl acetate resin film for agricultural use of JIS K6783 (1984) was applied to the tear test. The profile of the tear test piece according to JIS K6783 (JIS K6301 type R) was adopted to the test, and the testing speed was 50 m/min.

The coefficient of dynamic friction was measured by Suzuki's Method in which PP talc was used for the counterpart material.

The dumbbell type test piece of JIS K7127 was used to measure the curling amount. The test piece was left at a temperature of 150° C. for 250 hours, and the rate of change of the width in the central region was found.

The following can be understood from Tables 1 and 2.

(1) Although the tensile strength was improved a little in the first, second and third examples of Embodiment 1, the tear strength was remarkably improved. Of course, in the case where only a resin film layer was used as shown in Table 2, the tear strength can be increased in proportion to the increase in its thickness. However, in order to obtain practical tear strength shown in the first, second and third examples of Embodiment 1, it is necessary to increase the thickness of the screen to a value at which the screen is difficult to be curved. Therefore, it is not practical. Even when the thickness is reduced a little, permitting a decrease in tear strength, a very strong force is required to drive the screen, so that it is impractical. The aforementioned advantage can be also provided to other examples.

Strong tension is applied to the screen 41, so that the resin film layer 5 is used in an elongated condition. Since it is preferable to restrict the elongation of the resin film layer 5 within its elastic deformation range, the tensile strength was compared under the condition of 5% elongation.

(2) In the case of the first, second and third examples in Embodiment 1, the increase in drive force and noise caused by the lamination of the cloth layer 7 was avoided when the resin coat layer 8 was impregnated into the cloth layer 7. The frictional resistance of the screen 41 was reduced to half, and the drive force and sliding noise were remarkably reduced in accordance with the reduction of the frictional resistance. The aforementioned advantages can be also provided to other examples.

(3) It was found that the tear strength of the first, second and third examples in Embodiment 1 was superior to that of the third example in Embodiment 2. The reason is assumed that the cloth layer 7 provided on both sides of the resin film layer 5 prevented the resin film layer 5 from being torn.

(4) Wrinkles, curling and buckling were hardly caused in the process of bending of the first, second and third examples in Embodiment 1 compared with the examples in Embodiments 2, 3 and 4. In Embodiments 2 and 3, in the case where the screen was curved while the resin film layer 71 was set inside, the resin film layer 71 was not able to bear the aforementioned shearing stress, so that wrinkles were caused. It was found that curl was caused in the second example of Embodiment 2. In the example 4, in the case where the screen was curved while the resin film layer 71 was set inside, the resin film layer 71 was not able to bear the aforementioned shearing stress, so that buckling was caused. In the cases of the first, second and third examples of Embodiment 1, even when the screen is curved in either direction, the resin film layer 5 is contacted with the rollers through the cloth layer 7, so that a portion of the compression stress is held by the cloth layer 7 disposed inside. Therefore, wrinkles and buckling are hardly caused in the resin film layer 5. As a result, the travelling direction of the screen can be changed by the roller of a small diameter, and also the screen can be wound around the roller of a small diameter.

(5) In Embodiment 5, relatively excellent tensile and tear strength could be obtained without using the resin film layer 5. However, it was found that the following problems were caused as compared with Embodiments 1 to 4. First, the screen is expensive since high strength fibers are used. Further, since it is difficult to maintain the thickness of the cloth to not more than 200 μm, the film layer 5 is hard to laminate. The screen composed of a cloth layer simply coated with resin has a problem in which the ends of fibers tend to be ripped when the screen is slid or given tension. Concerning this problem, Embodiments 1 to 4 were remarkably superior. In Embodiment 5, a screen in which the material of the cloth was changed to nylon was tested, however, the tensile strength and elongation of the screen were far inferior to those of Kepler.

Variation 1

In the aforementioned embodiments, when the resin film layer 5 is composed of a film extended in the winding direction, the anti-elongation property of the film is excellent although the anti-tear property is inferior. On the other hand, although the anti-elongation property of the cloth layer is inferior, its anti-tear property is excellent. Therefore, when both are joined, a screen in which the anti-elongation and anti-tear properties are excellent can be provided.

Variation 2

When a disinfectant is mixed in or coated on the resin film layer 5 or the resin coated layer 8 in the above embodiments or variation, propagation of mold and bacteria on the surface of the resin film layer 5 or the resin coat layer 8 can be avoided.

For example, a disinfectant such as TBZ (tiazolebenzimidazole), PCMX (p-chloro-m-xylenol) and ZPT (zinc-pyrithion) is mixed into the silicon resin emulsion for resin coat layer 8 at a concentration of 100 to 2000 ppm.

Figure 9:
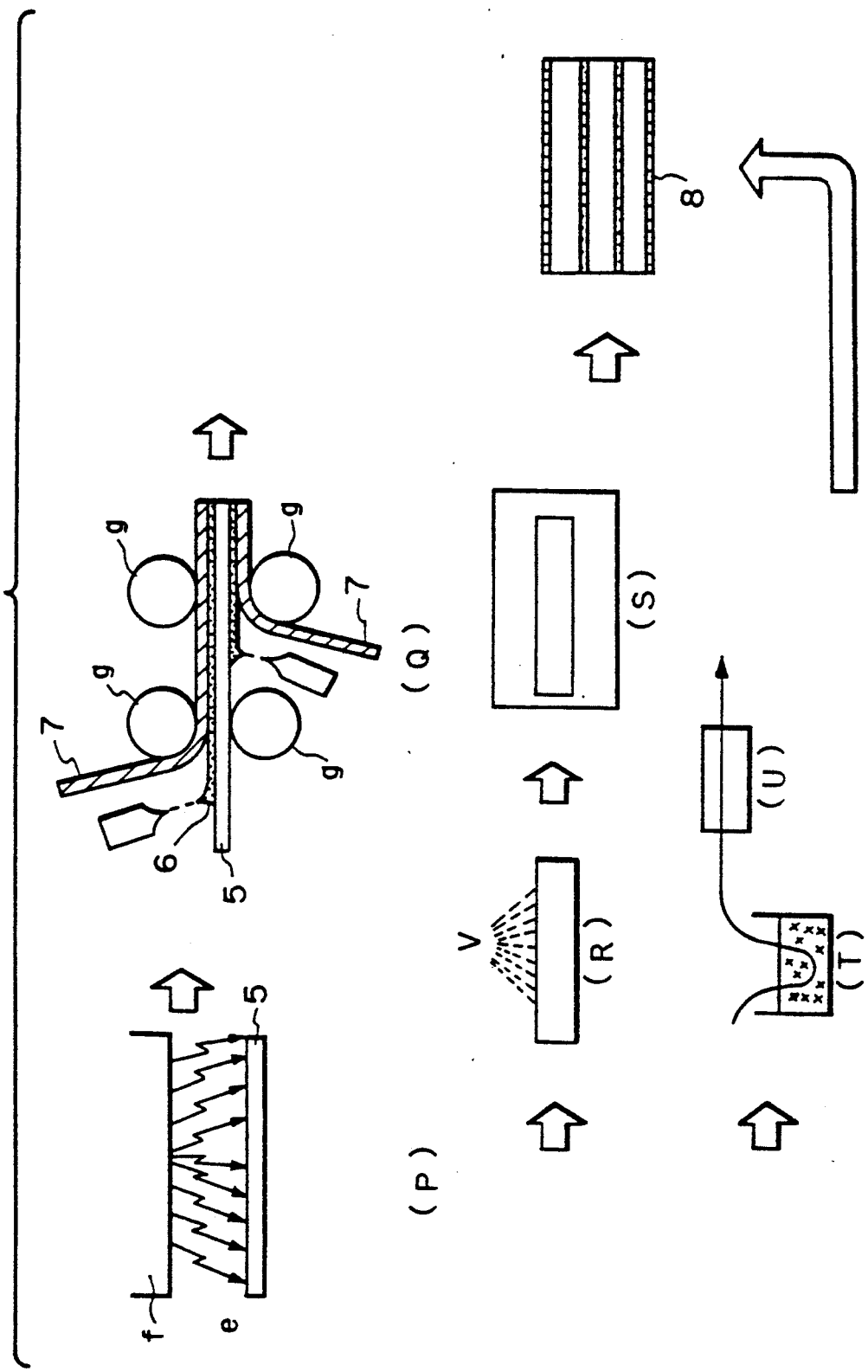
FIG. 9 is a schematic illustration showing a manufacturing process of the screen of Embodiment 1.

Next, with reference to FIG. 9, the manufacturing process of the screen 100 in Embodiment 1 will be explained as follows.

First, in step P, both surfaces of a PPS film used as the resin film layer 5 are made rough by means of corona discharge or plasma discharged from an electrode f, and coated with the adhesive 6, and the cloth layers 7 are adhered on the surfaces and transferred with rollers g, in step Q. Then, a silicon coating agent is sprayed in step R, and layers are dried by heating in step S. Alternatively, the layers are dipped into a silicon resin solution in step T, and then they are dried in step U, so as to form the resin coat layer 8.

In the case of the screen in the aforementioned Embodiment 1, the resin film layer 5 exhibits excellent tensile strength, bending strength and anti-creep property. At the same time, the resin film layer 5 inhibits the elastic deformation and plastic deformation (initial elongation) of the cloth layer 7, which are the weak points of the cloth layer 7. Also, the cloth layer 7 makes up for the tear strength of the resin film layer 5, which is the weak point of the resin film layer 5. The resin coat layer 8 makes up for the anti-abrasion property and the low frictional property of the cloth layer 7, which are the weak points of the cloth layer 7. Further, since each layer is provided with flexibility and an air sealing property, the entire screen satisfies the required characteristics.

Further, since the layers are disposed symmetrically in Embodiment 1, the curl of the screen, that is, permanent bending deformation can be greatly reduced as compared with a case in which the cloth layer 7 and the resin film layer 5 are simply laminated. That is, in the case where the cloth layer 7 and the resin film layer 5 are simply laminated, curl is caused and the screen surface is made convex on the side of the resin film layer 5 due to the difference between the moisture absorption swelling characteristics of the cloth layer 7 and that of the resin film layer 5. As a result, the position of the draft hole is displaced, so that the damper characteristics are changed, and the leakage of air is caused, and further the drive force and sliding noise are increased. These problems can be solved when the cloth layers 7 are laminated on both sides of the resin film layer 5 as shown in Embodiment 1.

Further, in the case of the screen in Embodiment 1, plastic deformation (buckling and wrinkles) of the resin film layer 5 with respect to bending can be inhibited as compared with a case in which the cloth layer 7 and the resin film layer 5 are simply laminated.

Other embodiments will be explained as follows.

Figure 7:
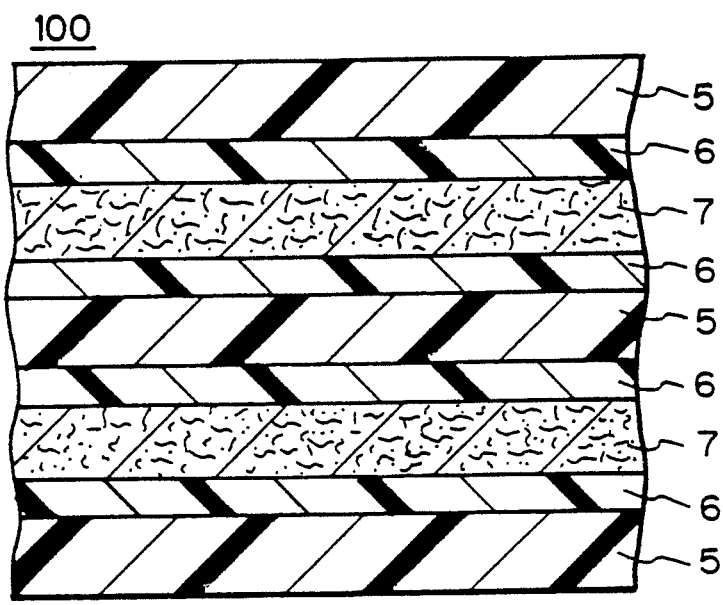
FIG. 7 is a partial sectional view of the screen of Embodiment 6 in which the device shown in FIG. 1 is used.

With reference to FIG. 7, the screen 100 of Embodiment 6 is explained.

This screen 100 is structured in the following manner: the cloth layers 7 are respectively adhered onto both surfaces of the resin film layer 5 with the adhesive layers 6; and the resin film layers 5 are respectively adhered onto the surfaces of both cloth layers 7 with the adhesive layers 6. The thickness of the entire screen is preferably 0.1 to 0.5 mm.

When the central resin film layer 5 is formed of an extended film and the resin film layers 5 on both sides are formed of an unextended film in this embodiment, the screen is softer than a screen in which an extended film having an anti-curl property and low friction property is used, so that its anti-buckling property can be improved. The aforementioned effects can be provided to not only this embodiment but also Embodiment 1.

Figure 11:
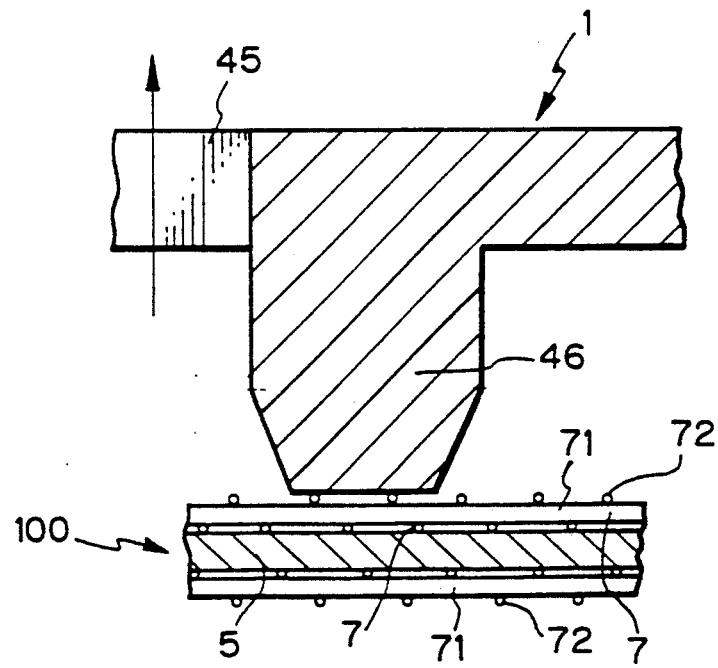
FIG. 11 is a partial sectional view of the screen of Embodiment 7 in which the device shown in FIG. 1 is used.

With reference to FIG. 11, the screen 100 of Embodiment 7 will be explained as follows.

FIG. 11 is an enlarged sectional view of the peripheral portion of the foot outlet 45. This screen 100 is slid on the top surface of the sliding edge 46 protruded inside encircling the foot outlet 45 of the air conditioner case 1.

This screen 100 is structured in the manner shown in Embodiment 1. The cloth layers 7 are respectively adhered onto both surfaces of the resin film layer 5. The resin coat layers not shown, the thickness of which is 10 μm, are impregnated onto the surfaces of the cloth layers 7.

In the cloth layer 7, the warps 71 extended in the longitudinal direction are thick (50 deniers in this case), and the wefts 72 are thin (20 deniers in this case).

Since the wefts 72 are thinner than the warps 71, the surface of the screen 41 becomes more smooth, so that the sliding resistance and sliding noise can be reduced. Since the warps 71 are thick, the tensile strength of the cloth layer 7 can be maintained high.

Even when the resin coat layer 8 is impregnated into the cloth layer 7, some of the irregularities caused by the warps and wefts remain on the surface in the case where the coating thickness is small. Of course, this embodiment can be adopted in the case where the resin coat layer 8 is not impregnated.

Figure 12:
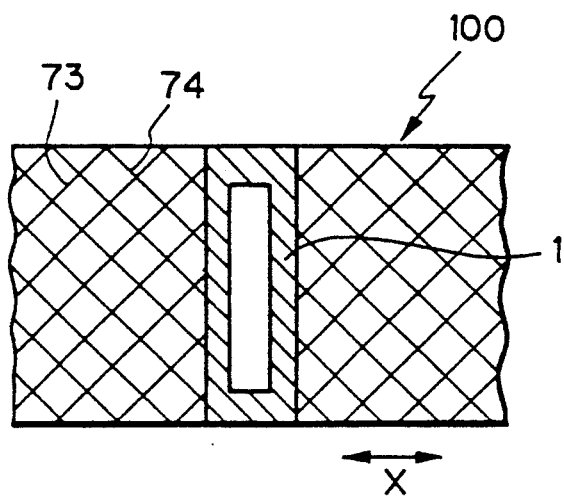
FIG. 12 is a partial sectional view of the screen of Embodiment 8 in which the device shown in FIG. 1 is used.

With reference to FIG. 12, the screen 100 of Embodiment 8 will be explained as follows.

FIG. 12 shows the screen 100 that slides on a portion of the surface of the air conditioner case 1.

This screen 100 is structured in the same manner as that of Embodiment 1.

The cloth layer 7 (shown in FIG. 2) of the screen 100 is woven from the warps 73 and wefts 74 that are respectively extended in the diagonal direction, the angle of which is, for example, 45° with respect to the sliding direction X.

This angle may be any certain angle except for a right angle.

As a result of the foregoing, the warps 73 and wefts 74 do not run on the heater core 13 (shown in FIG. 1) and the air conditioner case 1 all together as compared with a case in which the wefts 74 are disposed perpendicular to the sliding direction, so that the screen 41 can be smoothly slid and the drive force and noise can be reduced. Of course, only the warps and wefts of the cloth layer 7 sliding on the heater core 13 (shown in FIG. 1) and the air conditioner case 1, are disposed diagonally in the aforementioned manner.

The screen 100 of Embodiment 9 will be explained as follows.

In this embodiment, the pitch of the wefts is set wider than that of the warps extending in the longitudinal direction of the cloth layer 7 of the screen 100.

As a result of the foregoing, the sliding resistance of the screen 41 can be reduced, and the drive force and sliding noise can be also reduced. On the screen 41, the tension is applied in its longitudinal direction, so that the aforementioned pitch arrangement can be adopted.

We claim:

1. An air passage changeover device comprising:
   an air passage to guide an air flow;
   an air blowing means to blow air into the air passage;
   a drive roller provided in the air passage; and
   a screen made of a flexible thin film having a draft hole through which air passes;
   wherein the air passage is changed over when the screen driven by the drive roller is moved;
   wherein the screen includes a flexible high strength member having high tensile and tear strength and also includes a flexible low frictional member having low friction and high air sealing property; and
   wherein the high strength member includes a cloth layer composed of a large number of fibers, and the low friction member includes a resin coat layer impregnated into at least one surface of the cloth layer.

2. The air passage changeover device according to claim 1, wherein the screen comprises the resin film layer, a cloth layer adhered onto one surface of the resin film layer, and a resin coat layer impregnated onto the surface of the cloth layer.

3. The air passage changeover device according to claim 1, wherein the screen comprises the resin film layer, a plurality of cloth layers adhered onto both surfaces of the resin film layer, and a plurality of resin coat layers impregnated into the surfaces of the cloth layers.

4. The air passage changeover device according to claim 1, wherein the screen comprises the cloth layer, and a plurality of resin film layers adhered onto both surfaces of the cloth layer.

5. The air passage changeover device according to claim 1, wherein the cloth layer is formed with a plurality of warps disposed in a sliding direction and with a plurality of wefts disposed perpendicular to the warps, the warps and wefts are crossed with each other, and the wefts are thinner than the warps.

6. The air passage changeover device according to claim 1, wherein the cloth layer is formed with a plurality of warps disposed in a sliding direction and with a plurality of wefts disposed in a direction formed at a certain angle except for a right angle to the sliding direction, and both yarns being intercrossed to each other.

7. An air passage changeover device comprising
   an air passage to guide an air flow;
   an air blowing means to blow air into the air passage;
   a drive roller provided in the air passage; and
   a screen made of a flexible thin film having a draft hole through which air passes;
   wherein the air passage is changed over when the screen driven by the driver roller is moved;
   wherein the screen includes a flexible high tensile strength member having high tensile strength, low friction property and air sealing property, and also includes a flexible high tear strength member having high tear strength; and
   wherein the high tensile strength member includes a resin film layer, and the high tear strength member includes a cloth layer composed of a large number of fibers and adhered onto at least one surface of the resin film layer.

8. The air passage changeover device according to one of claims 1 to 6, wherein a disinfectant is provided onto the surface of the screen.

* * * * *